Jan. 9, 1951  H. S. THOMPSON  2,537,245
TRACTOR HITCH
Filed Jan. 12, 1949
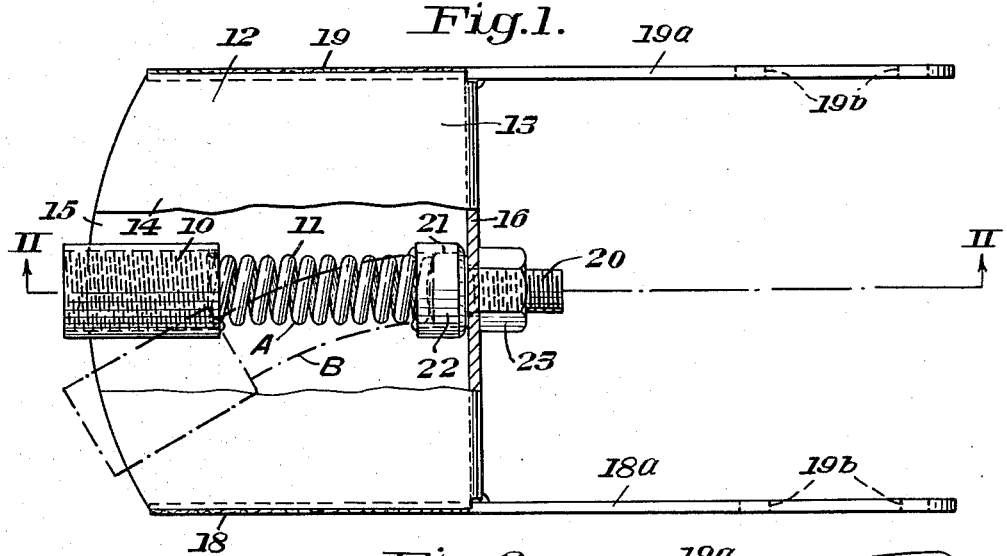
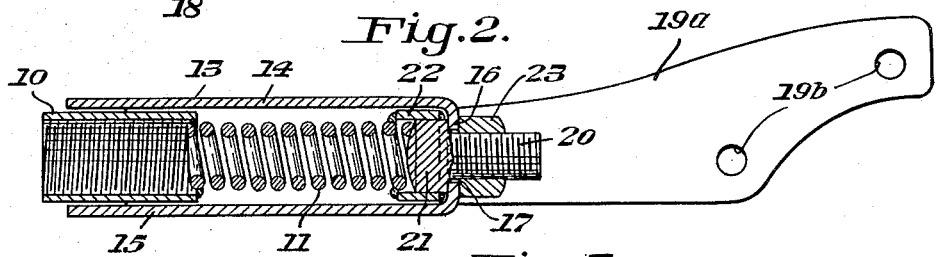
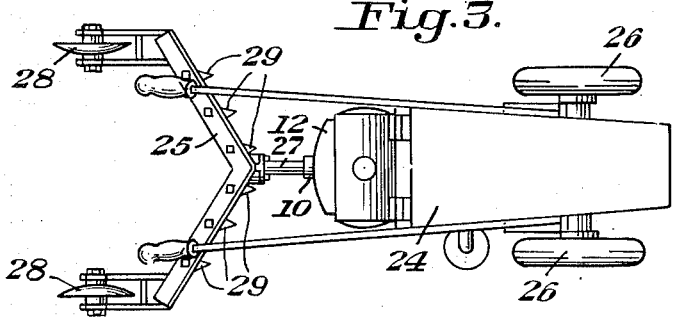
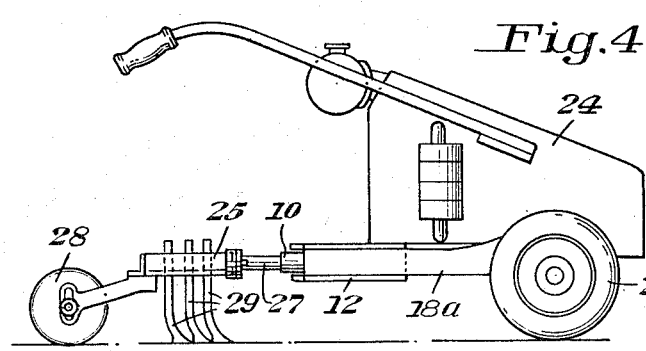
INVENTOR
Howard S. Thompson Patented Jan. 9, 1951

2,537,245

UNITED STATES PATENT OFFICE 2,537,245

TRACTOR HITCH

Howard S. Thompson, Canfield, Ohio, assignor to The Commercial Shearing & Stamping Company, Youngstown, Ohio, a corporation of Ohio Application January 12, 1949, Serial No. 70,465

5 Claims. (Cl. 280—33.9)

This invention relates to a hitch to connect a tractor to a trailer, and is particularly useful for connecting a one or two-wheeled tractor to an agricultural implement.

My tractor hitch comprises a strong, stiff spring to serve as a flexible connecting member between a tractor and trailer. The spring holds the tractor and trailer together and in alignment and absorbs tensile, compressional, torsional and horizontal bending shocks. The spring yields resiliently to permit the tractor and trailer to turn in a horizontal plane or to tilt sidewise relative to each other, but when the spring is deflected by such movement it exerts a counter-force which serves to restore the tractor and trailer to their initial alignment. In order to prevent either the tractor or the trailer from tilting toward or from each other, my tractor hitch has inflexible means to oppose such movement without interfering with the ability of the hitch to absorb shocks and to flex in the other ways stated above. The said inflexible means comprises a rigid case and a rigid cylindrical sleeve within the case adjacent an open end thereof. The case is adapted to be rigidly bolted to the tractor and has two horizontal flat plates forming the top and bottom of the case. The sleeve is rotatable and horizontally slidable between the said plates and is threaded internally so that it may be rigidly secured to a tongue extending from the trailer. The sleeve is flexibly secured to the case by the above-mentioned spring, which is welded at one end to the sleeve and the other end to an interior portion of the case. The sleeve slides horizontally and rotates within the case under the flexible control of the spring but any movement of the cylindrical member in a vertical plane is inflexibly resisted by parallel plates forming the top and bottom of the case.

My tractor hitch is particularly useful for connecting one or two-wheeled hand tractors to farm implements. Through the action of the sleeve between the two horizontal plates the hitch prevents the tractor and implement from pivoting toward or away from each other and thereby forms a composite vehicle in which the two units mutually support each other. The resiliency of the spring between the coupling members absorbs shocks such as occur when a tool on the farm implement strikes a rock, and also aids maneuverability by permitting the tractor to turn relative to the implement. The spring is strong enough to restore the initial alignment after the spring is deflected, and any tendency of the farm implement to tilt sidewise relative to the tractor is counteracted by the weight of the tractor acting through the spring. In other words, the weight of the tractor is utilized by means of my tractor hitch to stabilize the machine drawn by the tractor. This is particularly useful when the farm implement mounts a number of cultivator teeth making parallel furrows, because the furrows should be of even depth and the weight of the tractor is helpful in counteracting the tendency of the cultivators on one side of the implement to dig in or to pull up as varying conditions of earth and vegetation are encountered.

Further novel features and advantages of the drive and brake system of my invention will become apparent from the following detailed description and in the accompanying drawings.

I have shown in the drawings, for purposes of illustration only, the following preferred embodiment of my invention, in which:

Figure 1 is a top plan view of a tractor hitch incorporating my invention with the top horizontal plate broken away;

Figure 2 is a side sectional view of the tractor hitch on the line II—II in Figure 1;

Figure 3 is a top view of a tractor and cultivator connected by the tractor hitch; and Figure 4 is a side view of the tractor and cultivator shown in Figure 3.

Referring in detail to Figures 1 and 2 of the drawings, my tractor hitch comprises an internally threaded cylindrical coupling sleeve 10, a spring 11 welded at one end to the sleeve 10, a coupling member 12, and means for rigidly securing the other end of the spring 11 to the coupling member 12.

The coupling member 12 comprises a U-shaped case 13 (see Figure 2) having a horizontal upper plate 14 and a horizontal lower plate 15 connected by a generally vertical wall 16 having a central opening 17 therethrough. The sides of the case 13 are welded to vertical plates 18 and 19 respectively. The plates 18 and 19 have integral extensions 18a and 19a, respectively, and each of these extensions has a pair of bolt holes 19b through which the coupling member 12 may be rigidly secured to a tractor.

The means for rigidly securing the spring 11 to the member 12 comprises a bolt 20 having a head 21 welded to one end of the spring 11. A bushing 22 encircles and is welded to the bolt head 21 and also to the adjacent end of the spring 11 in order to strengthen the connection. The shank of the bolt 20 extends through the opening 17 and the bolt 20 is rigidly secured to the wall 16 by a nut 23.

The spring 11 is closely coiled and relatively stiff against compressive, tensile, twisting or bending forces, and its axial length is about three and a half times its outside diameter. The sleeve 10 slides laterally and rotates between the plates 14 and 15 under control of the spring 11, but is held rigidly against movement in a vertical plane by the plates 14 and 15. The internal threading of the sleeve 11 is adapted to hold a tongue extending from a trailer to be coupled by means of the hitch.

My tractor hitch is particularly useful in coupling a one or two-wheeled hand tractor to a farm implement. The example illustrated in Figures 3 and 4 shows the hitch coupling a tractor 24 to a cultivator 25. The tractor has two wheels 26 and is rigidly bolted to the extensions 18a and 19a of the coupling member 12. The sleeve 10 receives and rigidly holds a threaded end of a tongue 27. The other end of the tongue 27 has an integral tongued coupling member 27a rigidly but removably bolted at 27b to a grooved coupling member 25a rigidly attached to the cultivator 25. Two disks 28 are rotatably mounted on either side of the cultivator 25 and cultivator teeth 29 are mounted on the cultivator 25 with their lower ends just above the level of the bottom edges of the disks 28. The teeth 29 make shallow parallel furrows and cut through any vegetation extending in the path of the furrows as the tractor 24 draws the cultivator 25 over the ground.

The operation of the hitch is as follows: the tractor is driven forward (to the right as shown in Figures 3 and 4) under its own power and draws the cultivator 25 after it, with the spring 11 in tension between the coupling member 12 fastened to the tractor and the coupling sleeve 10 attached to the cultivator 25. When the tractor turns to one side (for example, to the right) the sleeve 10 slides between the plates 14 and 15 and the spring 11 is bent from the position shown at A in Figure 1 to a position such as that shown at B in Figure 1. The spring 11 in the deflected position shown at B in Figure 1 exerts a counter-force to return to the coupling sleeve 10 to the position shown at A, and this counter-force serves to restore the tractor and cultivator to the initial alignment shown in Figure 3. When the cultivator 25 is tilted sidewise relative to the tractor 24 the spring 11 is twisted torsionally and exerts a torsional counter-force to restore the tractor and cultivator to the level alignment shown in Figure 4. In this way, the tractor helps to stabilize the cultivator so that the cultivator teeth 29 will make furrows of even depth. Through the action of the spring 11, therefore, the hitch serves to draw the cultivator 25 after the tractor 24, to absorb shocks which might otherwise be transmitted between the tractor and cultivator, and to align and stabilize the tractor and cultivator. At the same time, the plates 14 and 15 and the sleeve 10 engage each other so that the cultivator 25 cannot rock forward on its supporting disks 28 and the tractor 24 cannot rock back on its supporting wheels 26. In this way the tractor and trailer mutually support each other and form a composite vehicle which is resiliently coupled together and yet is firmly self-supporting.

In the case of a one-wheeled tractor the operator would have to hold up the tractor to prevent it from falling over sidewise with the implement coupled to it, but otherwise the operation of the hitch attached to a one-wheeled tractor would be the same as that described above when attached to the two-wheeled tractor 24.

Although I have illustrated and described a preferred embodiment of the invention, it will be recognized that changes in the details and arrangements may be made without departing from the spirit of the invention or the scope of the appended claims.

I claim:

1. A coupling resiliently opposing bending in a horizontal plane and rigidly opposing bending in a vertical plane, comprising a member having horizontally and rigidly extending upper and lower portions spaced one above the other, a second member slidable horizontally between said upper and lower portions, one of said members being adapted to be connected to a tractor and the other of said members being adapted to be connected to apparatus to be moved by said tractor, and a coil spring having one end rigidly secured to the first member and the other end rigidly secured to the second member.

2. A coupling resiliently opposing torsional twisting and transverse bending in a horizontal plane but rigidly opposing transverse bending in a vertical plane, comprising a member having rigid horizontal plates spaced one above the other, a cylindrical second member rotatable and horizontally slidable between said plates, one of said members being adapted to be connected to a tractor and the other of said members being adapted to be connected to apparatus to be moved by said tractor, and a coil spring having one end rigidly secured to the first member and the other end rigidly secured to the second member.

3. A tractor-hitch resiliently opposing torsional twisting or transverse bending in a horizontal plane but rigidly opposing bending in a vertical plane, comprising a member adapted to be connected to a tractor and having rigid horizontal plates spaced one above the other, a cylindrical sleeve rotatable and horizontally slidable between said plates, said sleeve being internally threaded in order to be secured to apparatus to be coupled to said tractor, and a coil spring having one end rigidly secured to the first member and the other end rigidly secured to the sleeve, said spring being stiffly resilient, closely coiled and in the form of a cylinder.

4. A tractor-hitch resiliently opposing torsional twisting or transverse bending in a horizontal plane but rigidly opposing bending in a vertical plane, comprising a member adapted to be connected to a tractor and having rigid horizontal plates spaced one above the other, a cylindrical sleeve rotatable and horizontally slidable between said plates, said sleeve being internally threaded in order to be secured to apparatus to be coupled to said tractor, and a coil spring having one end rigidly secured to the first member and the other end rigidly secured to the sleeve, said spring being stiffly resilient, closely coiled and in the form of a cylinder having an axial length about three and a half times greater than its outside diameter.

5. A tractor having not more than two wheels, apparatus resting on the ground and movable by the tractor, and means hitching the tractor and apparatus together comprising a coupling member rigidly secured to the tractor and having horizontal plates rigidly spaced one above the other, a cylindrical second coupling member rotatable and horizontally slidable between said upper and lower plates and rigidly connected to a portion of the said apparatus, and a coil spring having one end rigidly secured to the first member and the other end rigidly secured to the second member, whereby the tractor and apparatus mutually support each other and form a composite unit resiliently articulated for twisting or horizontal bending movement.

HOWARD S. THOMPSON.

REFERENCES CITED

The following references are of record in the file of this patent:

UNITED STATES PATENTS

| Number | Name | Date |
|---|---|---|
| 1,267,318 | Fent et al. | May 21, 1918 |
| 2,091,668 | Bradford | Aug. 31, 1937 |
| 2,126,357 | Todd | Aug. 9, 1938 |

FOREIGN PATENTS

| Number | Country | Date |
|---|---|---|
| 9,930 | Great Britain | Feb. 4, 1915 |